March 15, 1966 L. D. YOKANA 3,239,882
DISPERSION HEAD FOR EXTRUDER
Filed July 18, 1962
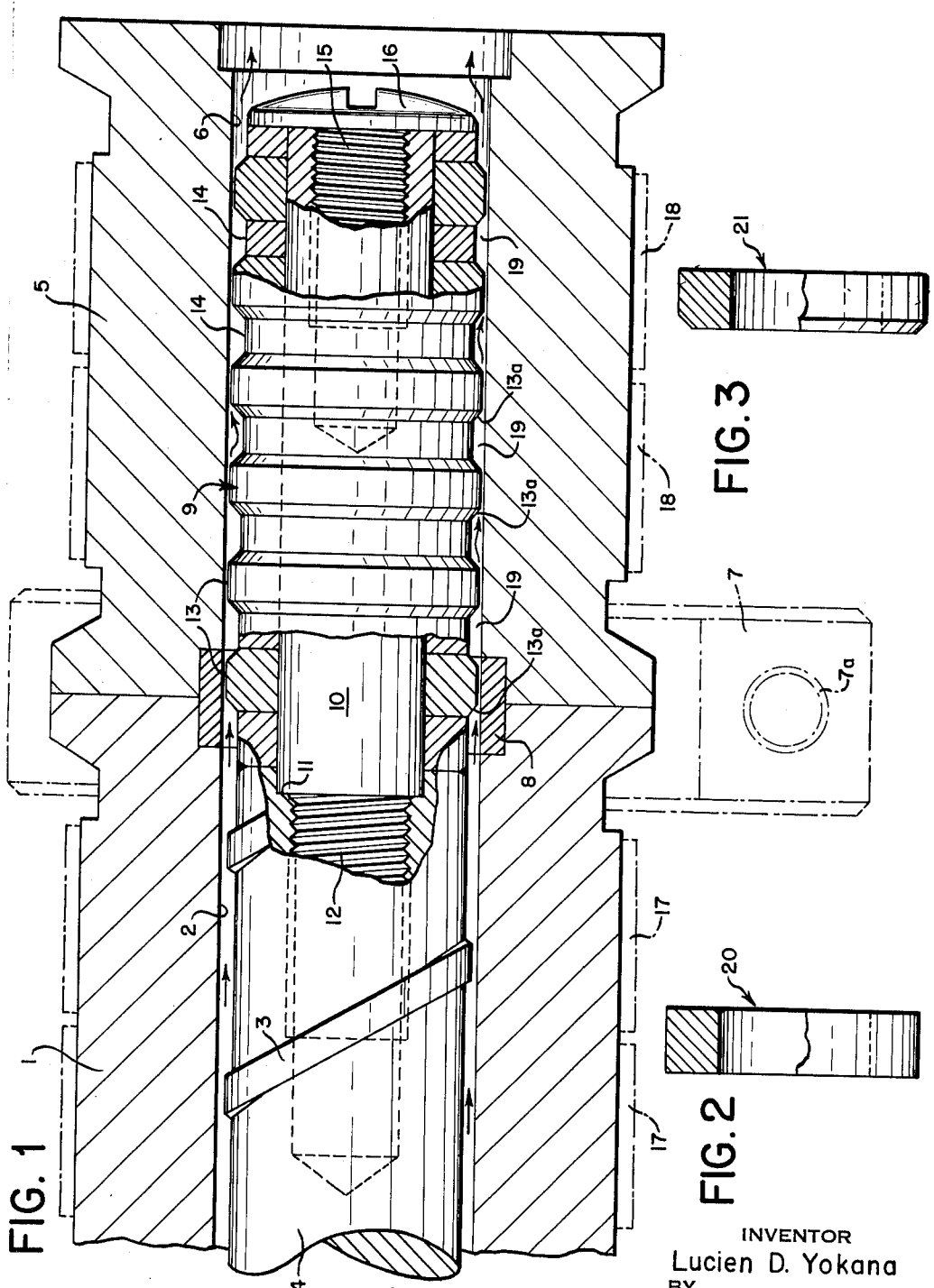
INVENTOR
Lucien D. Yokana
BY
ATTORNEYS

United States Patent Office 3,239,882
Patented Mar. 15, 1966

3,239,882
DISPERSION HEAD FOR EXTRUDER
Lucien D. Yokana, Princeton, N.J., assignor to Sterling Extruder Corporation, Linden, N.J., a corporation of New Jersey
Filed July 18, 1962, Ser. No. 210,812
2 Claims. (Cl. 18—12)

This invention relates to extrusion of organic plastic material and to an improved extrusion or plasticizer barrel for use in connection with extrusion molding apparatus. More especially, it relates to the provision of a dispersion or milling head associated with a conventional extruder or plasticizer barrel.

In the operation of a conventional extruder or plasticizer barrel the plasticizing screw serves to produce a mixing effect to impart strength to the plastic and, when color blends are used, to produce a uniform color in the extruded plastic. However, streaks of imperfection are apt to show up in later treatment. One example, of such treatment is when the plastic is expanded in a blow molding operation.

Also, with certain plastics, such as high density polyethylene or linear polyethylene, which are usually fed to the extrusion cylinder in the form of particles, some of the particles do not melt and are not plasticized. Such particles are sometimes referred to as gel particles and come through the apparatus in the form of fish eyes, or other imperfections, espcially when the plastic is extruded in the form of thin films such as a film extruded to .001 of an inch in thickness.

These and other disadvantages have been found to be overcome by means of the present invention, in accordance with which the extrusion or plasticizer barrel is provided with a dispersion or milling head, the parts of which may be either integral respectively with the barrel and the plasticizing screw, or made as separate extension members separately applied to each of these parts. Such a dispersion or milling head has a barrel extension section or portion and a shaft section or portion projecting from the discharge end of the plasticizing screw shaft.

On this projecting shaft there may be provided alternate narrow annular portions, sections, or rings, the cylindrical surfaces of which have small clearance with the surface of the bore, these sections or rings being known as shear sections or rings. Between these there are intermediate sections, portions or rings which are considerably smaller in diameter than the bore of the barrel extension so as to leave annular areas or spaces surrounding them. Such annular sections or rings may be integral with the projecting or extension shaft, or they may be formed as separate rings and mounted on this shaft.

It is not necessary that the widths of the anuular sections which have small clearance with the surface of the bore be the same as the widths of the intermediate sections of smaller diameter. That is to say, the widths of the annular sections making small clearance with the bore surface and the widths of the intermediate sections may be varied. Thus, the small clearance sections and the small diameter sections may have various widths, and, if desired, a wide small clearance section or ring may be followed by a narrow smaller diameter section or ring.

The bore of the barrel extension may be the same as that of the extruder barrel, or it may be larger or smaller than the bore of the barrel, depending upon the requirements of the installation.

The plastic material is forced forward by the plasticizer screw between the surfaces of the several shear sections, portions or rings, and the surface of the wall of the bore of the barrel extension, and the relative rotation of these surfaces subjects the extremely thin layer of plastic to high shearing stresses. At the same time, the plastic is subjected to high pressure. As the material leaves the trailing edges of such shear sections or rings and enters the respective annular spaces outside of the smaller diameter sections or rings, the shearing stress is suddenly reduced.

Such treatment of the plastic by subjecting it to the high shearing stresses, and which may be termed a milling action, is very beneficial in orienting the particles of the plastic material to improve different physical properties, and especially the strength of the material, and to eliminate air voids or air pockets from the plastic.

Further, in the mixing of plastics by means of the valving or backwashing action of the screw alone, it is necessary to build up very considerable pressures within the screw, and these excessive pressures become unnecessary with the use of the dispersion or milling head.

The use of the dispersion head will increase the effectiveness of any particular screw design. While it may be possible to produce a given set of results with specific screw designs and with screws of considerable length, the milling or dispensing head of the invention has the advantage that the same results can be obtained without altering the screw design or the length of the screw.

In certain cases deep flighted screws have been used in order to increase production. Such screws, however, do not produce as good a mixing action and also interfere with adequate heating of the plastic. By using the dispersion head lower temperatures can be used with these deep flighted screws, and additional heat imparted to the plastic from the working of the plastic in the dispersion head.

The invention will be further described in connection with the accompanying drawings. In these drawings:

FIG. 1 illustrates a form of the invention where the shear sections are in the form of rings and the intermediate sections are in the form of spacer rings, both of which are removably mounted on the shaft extension;

FIG. 2 shows a modified form of shear ring; and

FIG. 3 shows another modified form of shear ring.

In FIG. 1 an extruder barrel 1 has a bore 2 within which rotates a plasticizer screw 3 mounted on a shaft 4. At the discharge end of barrel 1 there is a hollow extension member 5 having a longitudinal bore 6 extending therethrough and forming a continuation or extension of bore 2 of the extruder barrel. For the purpose of mounting extension member 5 on the barrel 1 these two parts have conventional cam surfaced flanges of similar configuration which are united by means of a conventional clamping member 7, the parts of which are urged together by a clamping screw 7a.

An annular connecting ring 8 serves to form a tight joint between extension 5 and barrel 1, the longitudinal pressure exerted by the clamp and the angular cam flanges being exerted against the opposite edges of ring 8 instead of between the surfaces of the flanges. Ring 8 also serves to maintain the surfaces of bores 2 and 6 in alignment.

Rotating in bore 6 of the extension member, there is a dispersion or milling device indicated generally by reference numeral 9. As shown, this device is a composite structure, but if desired it can be made in one piece. The composite structure illustrated includes an extension shaft 10, the left end of which is reduced in diameter to form a shoulder 11 and provided with screw threads 12. The right end of the shaft 4 of the plasticizer screw is provided with an internally threaded drilled hole and counterbore to receive respectively the threaded portion 12 of the extension shaft and the shoulder 11. These threads are advantageously left-hand threads so that rotation of the shaft 4 and extension 10 in the clockwise direction when viewed from the right-hand end of the figure will tend to tighten the threaded connection.

Mounted on extension shaft 10 there is a plurality or series of large diameter rings 13 which will hereafter be referred to as shear rings, or shear sections, and also a series of intermediate spacing rings 14 of smaller diameter. The internal diameters of both sets of rings correspond to the diameter of shaft 10 and are arranged to make a snug fit on this shaft. This series of alternate large and small diameter rings is secured in position on shaft 10 so that they will rotate with the shaft, as for example by means of the cap screw 15 which is also equipped with a left-hand thread and received within a threaded opening within the right-hand end of shaft 10. This screw has a head or cap 16 which when the screw is tightened serves to clamp rings 13 and 14 against one another and against the right-hand end of shaft 4.

The clearances between the shear rings 13 and the surface of bore 6 are small and may be as low as .001 of an inch. Such clearance will increase with the size of the extruder and also depends upon the particular plastic material being processed. Also certain of the rings may be arranged to have the smallest clearance and certain others larger clearances.

When the organic plastic material is urged to the right by the plasticizer screw 3 the pressure on the material produced by this screw causes it to flow through extension 5 between the walls of bore 6 and the surfaces of the dispersing or milling member 9 including the close clearance spaces opposite the shear rings 13. Guiding the material to these close clearance spaces are sloping or chamfered surfaces 13a. If desired, the shear rings 13 having chamfered surfaces on the trailing as well as the leading sides may be replaced by shear rings 21 shown in FIG. 3 having a chamfered surface on the leading side only.

Conventionally the extruder barrel 1 is provided with electric heating devices 17 which supplement the heat generated by the plasticizer screw 3 in rendering the plastic flowable. Similar heating devices 18 may also be applied to the extension member 5 if desired, although mechanically produced heat is developed in the plastic as it passes through this member.

It will be understood that the plastic leaving the right end of extension member 5 is conveyed through suitable channels to the extruder dies, or to the parison dies when the articles are to be blow molded.

As the plastic material enters between one of the shear rings 13 and the wall of bore 6, the rotation of the surface of the shear ring with respect to the stationary wall of the bore subjects the thin layer or tube of plastic to extremely high shearing stresses and at the same time the plastic is subjected to high pressure from the plasticizer screw 3 which may range up to 10,000 or 15,000 p.s.i. As the material leaves the trailing edges of these shear rings 13 and enters the several annular spaces or areas 19 formed between the periphery of the spacer rings 14 and the surface of bore 6, the shearing stress is greatly reduced. The repeated subjection of the plastic to the extreme shearing stresses and the relief therefrom as just described has been found to bring about very desirable mixing and homogenizing actions on the plastic as heretofore referred to.

It will be understood that to meet the requirements of various installations the widths of the shear sections as represented by rings 13 may be varied as desired. Thus, the chamfered shear rings 13 may be replaced by unchamfered rings 20 (FIG. 2) and two or more of these rings placed side by side and followed by a spacing ring 14. Thus, there could be placed on the extension shaft 10 three sets of two shear rings 20 side by side, with spacing rings 14 between each pair. Also, if desired, to meet a particular situation, two sets of three shear rings 20 could be separated by a single spacing ring 14. Advantageously, a shear ring 21 (FIG. 3) chamfered on its leading edge only, is assembled with each set of unchamfered rings 20 to form the leading shear ring of each set.

Under certain circumstances it might be desirable to increase the length of shaft 10 and the number of alternate shear rings 13 and spacing rings 14, with a corresponding increase in the length of the barrel extension 5. Further, the arrangement of the shear rings 20 and 21 in sets of pairs or sets of threes, as previously described, may be used on this longer shaft 10. In addition, it might be desirable to employ a set of three shear rings 20, 21 followed by a set of two shear rings 20, 13, with a single spacing ring between the sets. This arrangement can be repeated throughout the length of shaft 10. It will thus be understood that any desired arrangement or combination of the shear rings and spacing rings may be made in order to meet the requirements of any given installation.

I claim:

1. The combination with an extruder of organic plastic material having a barrel with a plasticizer screw and shaft therefor rotating therein, of a dispersion head for causing mixing by subjecting the plastic material alternately to extreme shearing stresses and sudden relief therefrom, said dispersion head comprising a barrel extension at the discharge end of the extruder barrel, the extension having a cylindrical bore, and a shaft extension at the end of the screw shaft and rotatable therewith, the shaft extension having longitudinally spaced cylindrical shearing sections the peripheral surfaces of which have a proximity to the surface of the bore of a few mils, the lengthwise extent of the cylindrical sections being a vast multiple of the clearance between the cylindrical sections and the bore thereby providing a milling action characterized by high shearing stresses, said shaft extension having intermediate cylindrical sections alternating with said extended cylindrical shearing sections the surfaces of which are spaced from the surface of the bore to provide annular areas of uniform thickness throughout their circumference and having a lengthwise extent providing a substantial volume for mixing the plastic material, whereby rotation of the screw and shaft extension subjects the plastic material leaving the extruder barrel alternately to high shearing stresses between the cylindrical surfaces of the rotating extended cylindrical sections and the stationary surface of the bore and to mixing in said areas of substantial annular volume.

2. The combination with an extruder of organic plastic material having a barrel with a plasticizer screw and shaft therefor rotating therein, of a dispersion head for causing mixing by subjecting the plastic material alternately to extreme shearing stresses and sudden relief therefrom, said dispersion head comprising a barrel extension at the discharge end of the extruder barrel, the extension having a cylindrical bore, and a shaft extension at the end of the screw shaft and rotatable therewith, the shaft extension having longitudinally spaced cylindrical continuous shearing ring members rectangular in cross-section the peripheral surfaces of which are in close shearing proximity to the surface of the bore, the lengthwise extent of the ring members being a sufficient multiple of the clearance between their cylindrical surfaces and the bore to provide a milling action characterized by high shearing stresses, said shaft extension having similar cylindrical ring members intermediate the shearing ring members rectangular in cross-section but smaller in diameter than the cylindrical shearing rings and having their outer surfaces spaced from the surface of the bore to provide annular areas of substantial volume and of uniform thickness throughout their circumference and having a lengthwise extent sufficient to provide a substantial volume for mixing the plastic material, whereby rotation of the screw and shaft extension subjects the plastic material leaving the extruder barrel alternately to high shearing stresses between the cylindrical surfaces of the rotating extended cylindrical ring members and the stationary surface of the bore and to mixing in said areas of substantial annular volume.

(References on following page)

References Cited by the Examiner

UNITED STATES PATENTS

| | | | |
|---|---|---|---|
| 2,607,077 | 8/1952 | Dulmage | 18—12 |
| 2,705,131 | 3/1955 | Ross et al. | 18—12 |
| 2,813,302 | 11/1957 | Beck | 18—12 |
| 2,902,923 | 9/1959 | Stacy | 18—12 |
| 2,970,341 | 2/1961 | Mallory et al. | |

FOREIGN PATENTS

| | | |
|---|---|---|
| 1,139,133 | 2/1957 | France. |
| 476,748 | 5/1929 | Germany. |
| 610,557 | 3/1935 | Germany. |
| 1,014,735 | 8/1957 | Germany. |

J. SPENCER OVERHOLSER, *Primary Examiner.*

ROBERT F. WHITE, MICHAEL V. BINDISI, WILLIAM J. STEPHENSON, *Examiners.*